Figure 5:
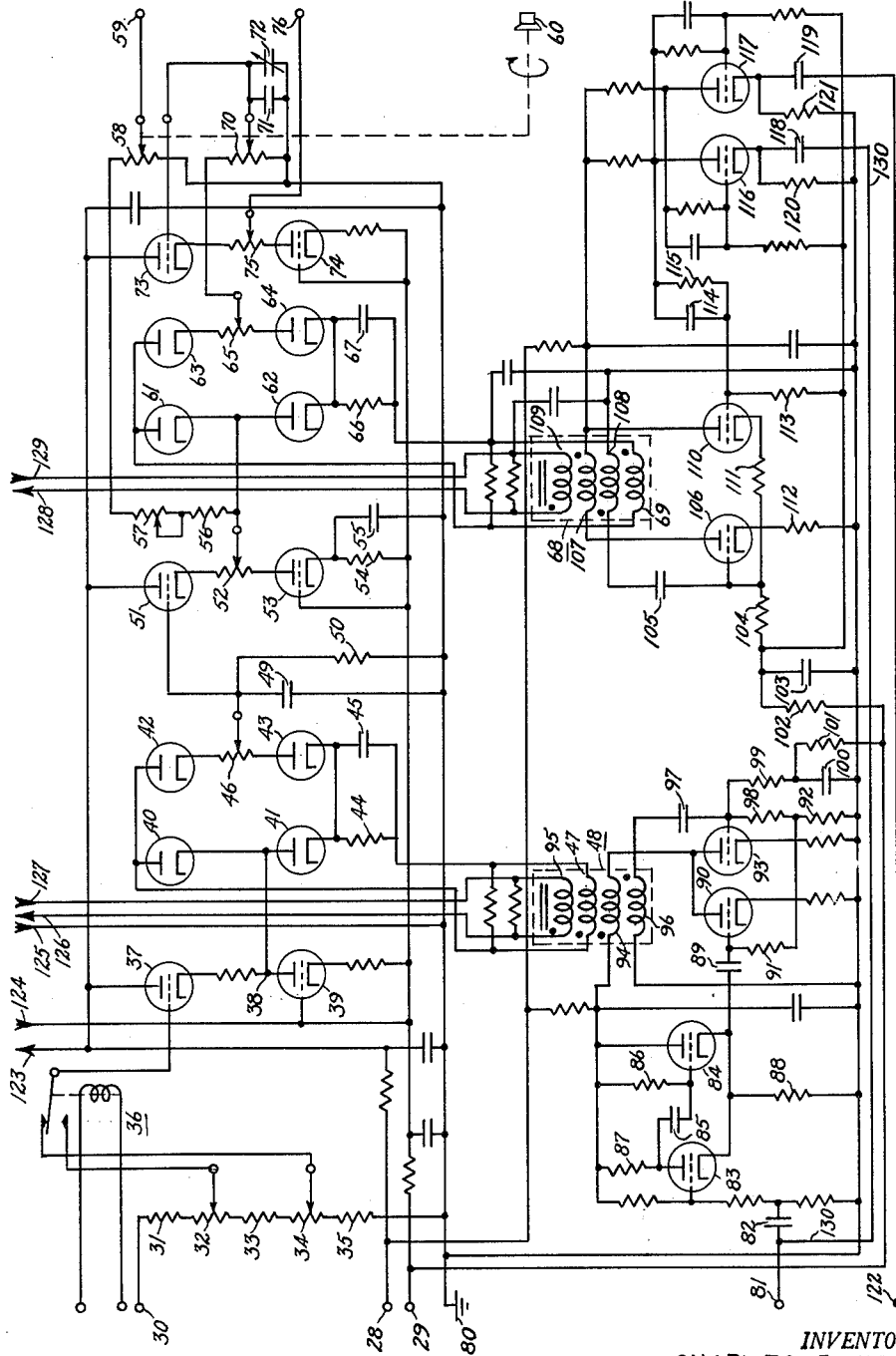

Oct. 27, 1964  C. R. KENNY  3,154,779
ALTITUDE CORRECTION TECHNIQUES
Filed Sept. 22, 1960  2 Sheets-Sheet 1
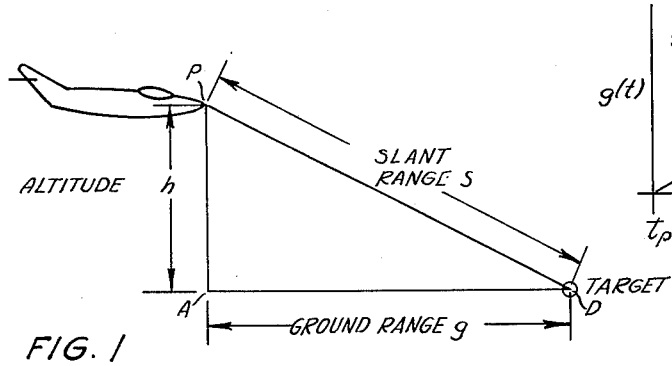
FIG. 1
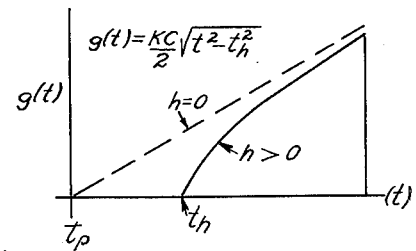
FIG. 2
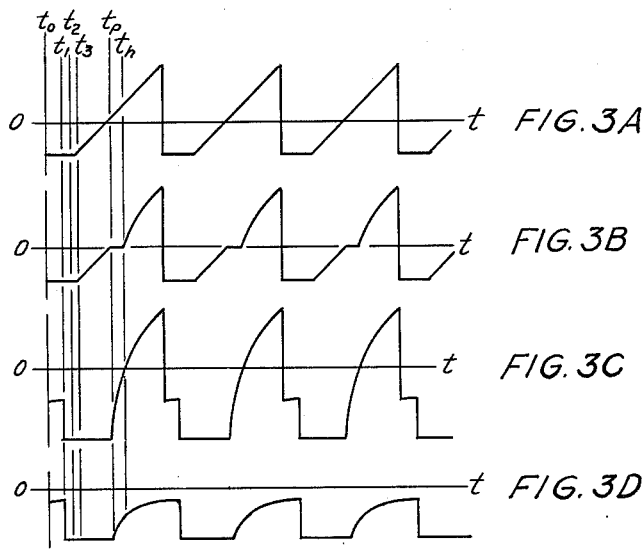
FIG. 3A
FIG. 3B
FIG. 3C
FIG. 3D
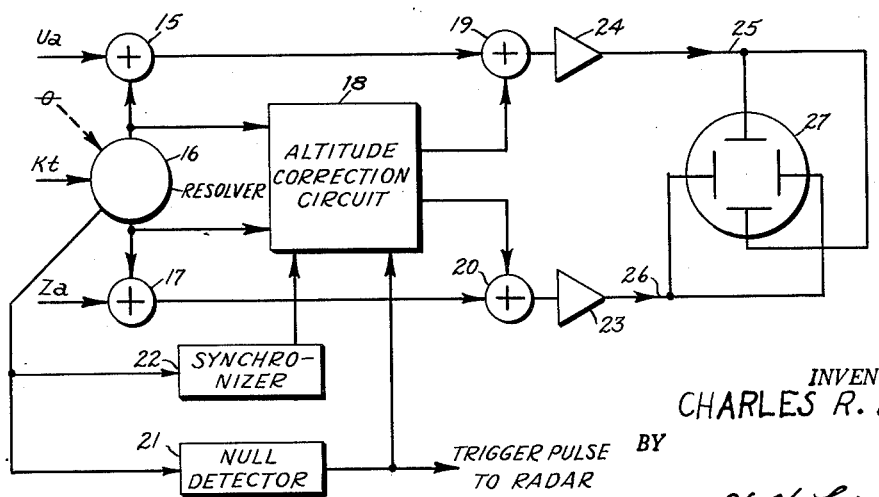
FIG. 4
INVENTOR.
CHARLES R. KENNY
BY
H. H. Losche
ATTORNEYS Oct. 27, 1964

C. R. KENNY 3,154,779

ALTITUDE CORRECTION TECHNIQUES

Filed Sept. 22, 1960

2 Sheets-Sheet 2

INVENTOR.
CHARLES R. KENNY
BY

*H. H. Losche*
ATTORNEYS

United States Patent Office 3,154,779
Patented Oct. 27, 1964

3,154,779
ALTITUDE CORRECTION TECHNIQUES
Charles Robert Kenny, Somers, N.Y., assignor, by mesne assignments, to the United States of America as represented by the Secretary of the Navy
Filed Sept. 22, 1960, Ser. No. 57,853
15 Claims. (Cl. 343—11)

This invention is related generally to radar and more particularly to radar systems producing ground range information.

In the radar art, particularly for mapping and navigation by means of aircraft mounted radar, inasmuch as the radar measures slant ranges it is necessary to provide some means of correction for altitude in order to produce ranges from a point on the ground or water directly below the aircraft (ground ranges). It seems that before the present invention, some use of computers has been attempted to compensate for the altitude effect. The present invention provides a novel solution to the problem.

In a preferred embodiment of this invention, conventional ramp function sweep voltages obtained from a resolver are modified to produce ground range representations in an indicator. These sweep voltages or ramp function voltages may be developed by any of the conventional sweep generators for providing ramp or sweep voltage functions to deflection circuits of a cathode ray tube. These sweep or ramp function voltages are also referred to as sawtooth voltages. Such conventional ramp function voltages may be developed in a manner shown and described in the text Radiation Laboratory Series, volume 22, on "Cathode Ray Tube Displays," section 4.6. These ramp function voltages are used for range sweep voltages as explained on page 14 of the above text. Accordingly, the ramp function voltages referred to in the description herein will be the voltages ordinarily used in displaying the slant range of ground objects and these ramp function voltages must be modified to present a display for ground range of ground objects. The modification is obtained by production of correction voltages which incorporate an altitude correction factor. The correction voltages include a direct current voltage component and an exponential voltage component. The direct current voltage component is produced by applying the ramp function signal input to a keyed diode bridge which permits a sample of that voltage to be stored in a capacitor. The keying of the diode bridge is accomplished by a pulse produced by a blocking oscillator in response to synchronizing pulses applied to a pulse section of my invention. The stored voltage is applied to the input of a cathode follower section. The output of the cathode follower section is applied through a potentiometer to a direct current output terminal. The potentiometer has a mechanical connection between its wiper and an altitude adjustment knob. Thus the direct current (D.C.) output can be made proportional to altitude.

The synchronizing pulse also initiates charging of the capacitances in an RC circuit as a result of producing oscillations in a free-running blocking oscillator which operates a keyed diode bridge having an input from the aforementioned diode bridge output. The charging of the capacitance ceases upon the occurrence of a pulse from a null detector which occurs when the ramp function voltage input to the resolver reaches the zero voltage level. This initiates discharge of the capacitances producing an exponential voltage which passes through a cathode follower and potentiometer to the exponential voltage output terminal. The exponential voltage output is made proportional to altitude by a mechanical connection of the wiper of the potentiometer to the altitude adjustment knob. The exponential output and the D.C. output, both of which are proportional to altitude, are then summed with the conventional ramp function voltage input and any suitable offset voltage and fed to an output amplifier for application to the sweep circuits of the indicator to provide for representations of ground range on the indicator.

It is therefore an object of this invention to provide means for the production of information representative of ranges other than slant range. It is another object of this invention to provide means for utilizing information obtained by a radar system located at an altitude above ground to produce information which portrays actual ground ranges from a point of reference on the ground. It is another object of this invention to provide means for production of sweep type voltages effective to provide a representation of true ground distances. Other objects and advantages and possible uses for the present invention will be recognized and appreciated by one skilled in the art when the following description is read with reference to the accompanying figures of drawing in which:

FIGURE 1 shows an aircraft and its relationship to points which will be referred to in this application in discussing the problems solved by the invention, FIGURE 2 illustrates the appearance of a sweep function according to a generalized formula where altitude is zero and also where altitude is greater than zero, FIGURE 3 represents various waveforms associated with this invention, FIGURE 4 represents a block diagram of the invention and its immediate environment, and FIGURE 5 represents a schematic diagram of the direct current and exponential producing channels and the associated pulse circuit of my invention.

Referring to FIGURE 1, there is shown an airplane having a radar antenna located at point P. The plane is flying at altitude $h$ above a point A on the ground. Radar returns from any point D on the ground are at slant range S from the airplane. The ground range to point D from point A directly below the aircraft is $g$.

A radar pulse emanating from the antenna in the aircraft will travel through distance 2S before being reflected and received. The time interval between transmission and reception is given by $$t = \frac{2S}{C}$$

where S is a slant range and C is the velocity of light. If an indicator display is desired in which the slant range of target is to be presented, a sweep is required of the form $$S(t) = K\frac{C}{2}t \tag{1}$$

where K=a constant.

If ground range is to be displayed, it is necessary to determine the time required for reception of the reflected pulse at point A on the ground, directly below the aircraft. This time period is given by $$t' = \frac{2g}{C}$$

where $g$ is the ground range. However, $$g = \sqrt{S^2 - h^2} \tag{2}$$

Therefore, $$t' = \frac{2}{C}\sqrt{S^2 - h^2} \tag{3}$$

To represent ground range, a sweep is used which is of the form $$g(t) = K\frac{C}{2}t' \tag{4}$$

Using the relations $$t = \frac{2S}{C} \quad (5)$$

and $$t_h = \frac{2h}{C} \quad (6)$$

and substituting Equation 3 for $t'$:

$$g(t) = K\frac{C}{2}\sqrt{t^2 - t_h^2} \quad (7)$$

Equation 7 represents the hyperbolic sweep waveform which must be used in the aircraft indicator to display ground-range co-ordinates. This waveform, the ground range sweep, is shown in FIGURE 2 where it is designated as $h > 0$. The conventional slant range sweep waveform is represented by the dotted line designated $h = 0$. The time $t_h$ represents the time after pulse transmission at time $t_p$, when the echo from a point A directly below the aircraft returns to the aircraft.

The conventional slant range sweep waveform is shown in FIGURE 3A. The ideal ground range sweep waveform is shown in FIGURE 3B.

Exact electronic generation of the hyperbolic waveform of Equation 7 is difficult. However, it can be generated electronically by using the following approximation:

$$g'(t) = K\left[\frac{C}{2}t - Ahe^{-\frac{\alpha Ct}{2h}} - Bh\right] \quad (8)$$

A, B, and $\alpha$ are coefficients derived from the results of the electronic equipment producing the wave nearest to the desired hyperbolic sweep as represented by Equation 7. The first term, $$\frac{C}{2}t$$

will produce a sawtooth; the second term, $$Ahe^{-\frac{\alpha Ct}{2h}}$$

will produce an exponential wave from the exponential letter $e$ to the power; and the term $Bh$, produces the D.C. component. This equation produces the waveform of FIGURE 3C which is the nearest approximation to the desired generation of FIGURE 3B. The present invention includes the circuits needed to generate the D.C. and exponential terms called for in Equation 8.

Referring to the FIGURE 4, there is shown a resolver 16 which may be of conventional construction and having an angle input $\theta$ representing the antenna course-line angle. The resolver also has an input voltage of the form $V = Kt$ which may be from a sweep generator of conventional nature. Resolver 16 produces an output proportional to the cosine of $\theta$ of the form $Kt \cos \theta$, which is summed with an offset voltage $U_a$ in a conventional summing circuit 15 to produce an input $U_a + Kt \cos \theta$ to a conventional summing circuit 19. Similarly resolver 16 produces an output $Kt \sin \theta$ to the conventional summing circuit 17 for summation with an appropriate offset voltage $Z_a$ to produce an output to the conventional summing circuit 20 of $Z_a + Kt \sin \theta$. The output $Kt \cos \theta$ from the resolver 16 is also fed to the altitude correction circuit 18 of my invention which produces the exponential and the D.C. voltage components necessary to provide a true ground range sweep. Accordingly, the output of the correction circuit to summing circuit 19 is $$[g'(t) - Kt] \cos \theta$$

where $g'(t)$ is as represented by Equation 8 above. This output is summed in circuit 19 with the output from the circuit 15 to produce an output through a conventional amplifier 24 for amplification and application through lead 25 to one set of deflection plates of indicator 27 of a signal representable by the formula $U_a + g'(t) \cos \theta$. The output $Kt \sin \theta$ from resolver 16 is fed to the Z channel of altitude correction circuit 18 where it is treated in the same manner as the $\cos \theta$ input to the U channel so that the Z channel output from 18 is fed to the summing circuit 20. The summed output is amplified in amplifier 23 and fed through connection 26 to the other set of deflection plates of the indicator and is a signal which can be represented by the formula $Z_a + g'(t) \sin \theta$.

A replica of the $V = Kt$ input signal to resolver 16 is available on the compensating winding of the resolver and is fed to null detector 21 which, upon detection of a zero voltage in the sweep signal produces a pulse to the altitude correction circuit 18 for purposes as will be described hereinafter. The input to the null detector from resolver 16 is also fed the synchronizer 22 which again may be of conventional construction to produce pulses to the altitude correction circuit 18 in a manner and for purposes as will be described hereinafter. The null detector 21 also produces the trigger pulse to a conventional radar system associated with this invention to trigger the main bang of the radar.

The FIGURE 5 shows in detail the altitude correction circuit 18 of FIGURE 4. The altitude correction circuit includes what will be called the Z channel, the U channel, and the pulse section. The U channel and Z channel are identical, so for simplicity of presentation the Z channel only is shown with the pulse section in FIGURE 5. For the Z channel, there is an input terminal 30 which is connected through the voltage divider having resistors 31, 33, and 35, in series with the resistance windings of potentiometers 32 and 34, to a point of constant reference potential (ground) 80. The wipers of potentiometers 32 and 34 are connected to fixed contacts of a relay 36 which is for purposes as will be set out hereinafter. The movable contact of relay 36 is connected to the grid of a triode 37 which is connected in series with a resistance and triode 39 and another resistance across a source of potential having a positive input terminal 28 and negative input terminal 29. The two triodes 37 and 39 may be sections of a dual triode if desired and constitute a cathode follower having an output from junction 38 between the cathode resistance of triode 37 and the anode of triode 39 to the junction between cathode of diode 40 and the anode of diode 41. Diodes 40 and 41 constitute the input stage of a sampling keyed rectifier bridge. Diodes 42 and 43 having the anode of the former coupled to the anode of diode 40 and the cathode of the latter 43 connected to the cathode of diode 41 constitute the output stage of the sampling keyed rectifier bridge. The common connection of cathodes of the diodes 41 and 43 is coupled through a resistance 44 and capacitance 45 in parallel to winding 47 of transformer 48, the winding 47 being connected in turn to the common connection of the anodes of diodes 40 and 42 to produce a circuit. The cathode of diode 42 is connected through the resistance element of potentiometer 46 to the anode of diode 43. The movable contact of potentiometer 46 is connected to ground 80 through the resistance capacitance circuit comprising resistance 50 and capacitance 49 in parallel. The movable tap of potentiometer 46 is also connected to the grid of triode 51 which has its anode coupled to the positive terminal 28 and its cathode coupled through the resistance element of potentiometer 52 to the anode of triode 53. Triode 53 has a grid coupled to the source of negative potential at terminal 29 and has its cathode coupled through resistor 54 to the source of negative potential at terminal 29. The cathode of triode 53 is also connected through capacitor 55 to ground 80. Triodes 51 and 53, which may be sections of a dual triode, constitute a cathode follower producing an output through the wiper of potentiometer 52 which output takes one path through resistance 56 and variable resistance 57 and through the wiper of potentiometer 58 to the direct current output terminal 59. The output from potentiometer 52 takes another path to the common connection between the cathode of diode 61 and the anode of diode 62. Diodes 61 and 62 and diodes 63 and 64 constitute a switching keyed rectifier bridge wherein the anodes of diodes 61 and 63 are connected together and the cathodes of diodes 62 and 64 are connected together. The common connection of the cathodes of diodes 62 and 64 is connected through the parallel arrangement of resistance 66 and capacitance 67 to the winding 69 of transformer 68 which winding is in turn connected to the common connection of the anodes of diodes 61 and 63. The cathode of diode 63 is connected through the resistance element of potentiometer 65 to the anode of diode 64. The wiper of potentiometer 65 is connected through the resistance of potentiometer 70 to ground 80. The wiper of potentiometer 70 is connected to a common connection between capacitance 71 and variable capacitance 72 which are connected in parallel between the wiper of potentiometer 70 and ground 80. The wiper of potentiometer 70 is also connected to the grid of triode 73 which triode along with triode 74 is connected across the source of potential at terminals 28 and 29. The cathode of triode 73 is connected to the anode of triode 74 through the resistance element of potentiometer 75 and constitute a cathode follower having an output through the wiper of potentiometer 75 to terminal 76. The wipers of potentiometer 58 and 70 are mechanically connected to an altitude adjustment knob 60 which provides a means of rendering the outputs of the circuit proportional to altitude. Thus far, the construction of the Z channel has been described. Description of the pulse section follows.

Input terminal 81 of the pulse section is connected through coupling capacitor 82 and a resistance to the grid of a triode 83 of a one-shot multivibrator. The anode of triode 83 is connected to the grid of triode 84 and the cathodes of triodes 83 and 84 are connected through resistance 88 to ground 80. The anode of triode 83 is connected through a resistance 87 to the anode of triode 84 and resistance 86 is connected between the grid of triode 84 and the anode thereof to provide a cathode coupled monostable multivibrator. The anode of triode 84 of the multivibrator is connected through a resistance to the source of positive potential at terminal 28. It is also connected through winding 94 of transformer 48 to the anode of triode 93 whose cathode is coupled through a resistance to ground 80. The anode of triode 93 is connected to the anode of triode 90 which has a cathode coupled through a resistance to ground 80. The common connection of the cathodes of triodes 83 and 84 of the monostable multivibrator are coupled through capacitor 89 to the grid of triode 90. The grid of triode 90 is connected through resistance 91 and resistance 98 to the grid of triode 93. The gird of triode 93 is connected through capacitance 97 and thence through winding 96 of transformer 48 to ground 80. The common connection between resistance 91 and resistance 98 is connected through resistance 92 to ground 80. The grid of triode 93 is connected through resistance 99 and resistance 101 in series to the source of negative potential terminal 29. There is a capacitor 100 connected between ground 80 and the common connection of resistances 99 and 101. There is a resistance 102 having one terminal connected to the terminal 29 and another terminal connected through resistance 104 to the grid of triode 106 and through resistance 111 to the cathode of triode 110. Capacitor 103 is connected between ground 80 and the common connection of resistances 102 and 104. The grid of triode 106 is connected through the capacitor 105 to the winding 108 of transformer 68 and then to ground 80. The cathode of triode 106 is connected through resistance 112 to ground 80. The anode of triode 106 is connected through winding 107 of transformer 68 to the anode of triode 110. Triode 110 has a grid connected through resistance 113 to the common connection between resistances 102 and 104. The grid of triode 110 is connected to the anode of triode 116 through capacitor 114 and resistor 115 in parallel. Triode 116 has a cathode coupled through capacitor 118 to synchronizing pulse input terminal 81. The cathode of triode 116 is connected through a resistance 120 to ground 80, which is connected through resistance 121 to the cathode of triode 117. The cathode of triode 117 is also connected through capacitor 119 to null pulse input terminal 122. The grid of triode 117 is coupled through a resistance and capacitance in parallel to the anode of triode 116 and the grid of triode 116 is connected through a resistance and capacitance in parallel to the anode of triode 117. Triodes 116 and 117 and their associated circuitry constitute a bistable multivibrator.

Winding 95 of transformer 48 has outputs 126 and 127 which are connected to a keyed sampling rectifier bridge of the U channel in the same manner as the keyed sampling rectifier of the Z channel is connected to winding 47 of transformer 48. Similarly, winding 109 of transformer 68 is connected to outputs 128 and 129 which operate a switching keyed rectifier in the U channel in the same manner as winding 69 operates the keyed rectifier of the Z channel. Terminals 123 and 124 provide a source of positive and negative potential, respectively, to the U channel and terminal 125 provides a source of constant reference potential to the U channel.

*Operation*

The mathematical expression for the altitude-corrected deflection voltage on one pair of deflection plates of the cathode ray tube 27 of FIGURE 4 is $Z_a + g'(t) \sin \theta$. The $\sin \theta$ factor is supplied by a signal input of $Kt \sin \theta$, brought into terminal 30 of the Z channel of FIGURE 5 from the resolver 16 of FIGURE 4 and put across a voltage divided including resistors 31, 33, and 35, and potentiometers 32 and 34. For a single value of $\theta$ the signal input is of the form shown in FIGURE 3A. From the voltage divider, the $Kt \sin \theta$ signal is applied to the grid of triode 37 of the first cathode follower stage through the wiper of either 32 or 34, depending on whether relay 36 is or is not energized. This relay has the function of changing the Z scale factor and is energized when the range between aircraft and reference point or target D in FIGURE 1 is less than 30 miles, for example, triode 39 is included in the cathode circuit of triode 37. Triodes 37 and 39 may be two halves of a duo-triode. Since the output signal is taken off this cathode circuit, this stage may be referred to as the $Kt \sin \theta$ cathode follower. From this stage, the cathode follower output signal is brought to the sampling keyed rectifier bridge including the four diodes 40, 41, 42, and 43, which are connected in series-parallel, and operate as an electronic switch. Since each series combination of the diodes plus its RC biasing circuit, composed of resistance 44 and capacitance 45, is connected across a secondary winding 47 of transformer 48 in the pulse section, the appearance of a voltage of the correct polarity across the winding 47 will key the diodes into performing their switching function.

A synchronizing pulse from synchronizer 22 of FIGURE 4 enters terminal 81 of FIGURE 5 at time $t_1$ in FIGURE 3A. This pulse triggers the one-shot multivibrator of the pulse section which restores at time $t_2$ of FIGURE 3A. When the multivibrator restores at $t_2$, differentiating circuit 89, 91, 92 produces a positive pulse to the grid of the blocking oscillator triode 90. The blocking oscillator delivers a pulse by means of transformer 48 to the sampling keyed rectifier bridge. When this occurs the signal path between the input to the diodes at the common connection of cathode of diode 40 and anode of diode 41, and the output at the wiper of potentiometer 46, is completed and the input is "sampled." This allows capacitor 49 to charge proportional to the amplitude of the $Kt \sin \theta$ signal on the cathode follower output during the $t_2$ to $t_3$ portion of the dead time or dwell time existing from $t_0$ to $t_3$. The capacitance 49 is part of a storage circuit of long time constant which circuit includes resistance 50 and stores the voltage until the next subsequent sampling pulse (which would occur in the next cycle). This voltage is fed to the grid of D.C. cathode follower triode 51, the output of which divides into two paths. One path leads from the wiper of the potentiometer 52 through a resistor network 56, 57 to the resistance element of potentiometer 58. The setting of the wiper of potentiometer 58 is controlled mechanically by the altitude adjustment knob which is used by the operator who adjusts it according to aircraft altitude. It should be noted, of course, that this adjustment can be automatic. Thus, the voltage stored in capacitor 49, after isolation by the D.C. cathode follower, is multiplied by the aircraft altitude. It will be recalled that the altitude-corrected ground range signal should contain a D.C. component. The output at the wiper of potentiometer 58 is the D.C. component for the Z channel.

In addition to the D.C. signal component, an exponential signal is required for the altitude corrected signal. A second path from the wiper of potentiometer 52 brings the output of the D.C. cathode follower 51 to the switching keyed rectifiers including the four diodes 61, 62, 63, and 64, which are connected in series parallel and operate as an electronic switch. The switching voltage across these diodes and their bias circuit resistance 66 and capacitance 67 is supplied from a secondary winding 69 of transformer 68 in the pulse section. The diodes are therefore controlled, or keyed, by a series of narrow pulses from the pulse section which are produced by the free running blocking oscillator including triode 106. The blocking oscillator is started by the bistable multivibrator triggered by sync pulse at time $t_1$. When the diodes are keyed into operation during each of the narrow pulses, the output of the D.C. cathode follower triode 51 is connected to the resistance element of potentiometer 65. The voltage at the wiper of potentiometer 65 is applied to the resistance element of potentiometer 70. Since the wiper of potentiometer 70 is tied mechanically to the altitude adjustment knob 60, the voltage is multiplied by the aircraft altitude. This voltage causes a charge to be stored in capacitors 71 and 72. The value of the charge is proportional to $h \sin \theta$. When the keying voltage on diodes 61, 62, 63, and 64, is removed at time $t_p$ in FIGURE 3, the charge on capacitors 71 and 72 decays exponentially at a rate determined by the time constant of the two capacitors 71 and 72 and the portion of the resistance element of potentiometer 70 between the wiper and ground 80. During decay of the charge on capacitors 71 and 72 the exponential signal of the form shown in FIGURE 3D is fed to cathode follower triode 73 and from the cathode follower through the wiper of potentiometer 75 to output terminal 76. Output 76 provides the exponential function in Formula 8 and is a function of the aircraft altitude, while the output 59 provides the D.C. component of the altitude corrected signal. The outputs from 59 to 76 are summed in the summing circuit 20.

In its design, the U-signal section of the altitude correction circuit 18 in FIGURE 4 is identical to the Z section. However, the signal input to the U-section is the $Kt \cos \theta$ signal. Though operation of portions of the pulse section have been mentioned during description of the Z channel, the operation in more detail is as follows: A positive synchronizing pulse originating in synchronizer 22 of FIGURE 4 is fed into the pulse section through terminal 81 at time $t_1$. The positive pulse then takes two paths. In the first path, the synchronizing pulse is applied to the grid of triode 83 of the one-shot delay multivibrator composed of triodes 83 and 84 and their associated circuitry, causing triode 83 to conduct. The second triode 84 is then cut off, and a negative pulse appears at the cathode of triode 84. Since the trailing edge of this pulse is positive going, it appears at the grid of trigger amplifier 90 as a positive voltage spike after differentiation by the RC circuit including capacitance 89, and resistances 91 and 92. This positive spike appears on the grid of triode 90 at time $t_2$ in FIGURE 3, which is an appreciable time, 150 microseconds, for example, after the synchronizing pulse. It is amplified by triode 90 and triggers sampling blocking oscillator triode 93 to produce a positive pulse at the anodes of the Z channel sampling keyed rectifier bridge diodes 40, 41, 42, and 43 to put these tubes into operation. Of course the same effect is produced in the U-channel sampling keyed rectifiers. The second path taken by the synchronizing pulses leads them from terminal 81 through connector 130 to the cathode of the bistable switching multivibrator triode 116. A positive synchronizing pulse applied to this cathode cuts off this triode of the multivibrator resulting in a positive gate at the anode of this triode. When applied through capacitor 114 to the grid of the cathode follower triode 110, the positive gate signal is transferred to the grid of switching blocking oscillator triode 106. The free-running switching blocking oscillator including triode 106 then produces a series of narrow pulses, each of which results in a positive keying pulse applied to the plates of the switching keyed rectifier diodes 61, 62, 63, and 64. The consequent repeated flow of current in the rectifiers results in the storage of a charge in the capacitances 71 and 72 used for the Z channel exponential voltage. At the same time, a charge is stored in the identical circuits of the U-channel. The null pulse from the null detector 21 in FIGURE 4 which occurs at time $t_p$ in FIGURE 3A and sets off the main bang of the associated radar, is brought into the pulse section through terminal 122. This positive pulse is brought to the cathode of switching multivibrator triode 117, thus cutting off this triode section of the switching multivibrator. The triode 116 then conducts, feeding a negative gate through capacitor 114 to the grid of the cathode follower triode 110. Transfer of the negative gate through resistance 111 to the grid circuit of the switching blocking oscillator triode 106 stops its oscillation. The switching keyed rectifiers thus cannot operate, and the charge in the Z channel RC circuit 70, 71, and 72, is permitted to leak off to ground 80. The exponential signal is supplied to the exponential cathode follower triode 73. It is taken from there through the wiper of potentiometer 75 to the Z channel exponential output terminal 76. The same effect is produced in the U-channel. The decay of the voltages corresponding to the stored charges in the U and Z channels continue until the arrival of another synchronizing pulse again operates the sampling keyed rectifiers and the switching keyed rectifiers in the U and Z channels.

Owing to the long time constant of the RC circuit 49, 50 for the Z channel, the charge stored in it has hardly diminished in the interval between the first synchronizing pulse and the next; thus, the voltage fed to the Z channel D.C. output terminal 59 remains substantially constant. The same is true for voltage at the U-channel D.C. output terminal.

Referring to FIGURE 4, summation in circuits 19 and 20 of the output of the altitude correction circuit 18 with inputs from summing circuits 15 and 17 produces outputs corrected for altitude and of the form shown in FIGURE 3C. The ideal output would be of the form shown in FIGURE 3B.

The trigger pulse from the null detector is caused to occur when the ramp function input voltage reaches zero at time $t_p$ so that the ramp function voltage is area balanced.

While the foregoing has been a description of a preferred embodiment of the present invention to explain the nature of the invention, it should be understood that many changes and modifications thereof are possible which are within the scope of the invention which is defined by the appended claims.

What is claimed is:
1. A circuit for modifying linear ramp function voltage signals each having two co-ordinate sides to drive the deflection circuits of a cathode ray tube radar receiver in a manner corrected to display the linear function of one of said co-ordinate sides comprising:

an input for applying ramp function voltage signals for driving the deflection circuits of a cathode ray tube radar receiver;

adjustable means to adjust voltage conduction therethrough representative of the linear function of one of said co-ordinate sides;

first means coupled to said input for producing a direct current voltage proportional to the ramp function voltage of said input signals at a specific time;

second means coupled to said first means and responsive to a predetermined voltage level of said ramp function voltage signals to produce an exponentially varying voltage coincident in time with said ramp function voltage signals from said predetermined voltage level;

synchronizing input means coupled to said first and second means to synchronize the production of said direct current and exponential varying voltages; and means coupling the outputs of said first and second means through said adjustable means to an output thereby modifying said ramp function voltage signals in an exponential manner to produce a cathode ray tube radar display representative of a linear function along said one co-ordinate side.

2. A circuit for modifying linear ramp function voltage signals as set forth in claim 1 wherein said first means includes a first sampling and switching circuit and a first storage means, the first sampling and switching circuit and first storage means being coupled in series from said input circuit to said adjustable means whereby said ramp function voltage signals are sampled, switched, and stored in one polarity for application to said output through said adjustable means.

3. A circuit for modifying linear ramp function voltage signals as set forth in claim 2 wherein said second means includes a second sampling and switching circuit and a second storage means, the second sampling and switching circuit being coupled between said first storage means and said second storage means, and said synchronizing input is coupled to said second sampling and switching circuit to switch said second switching and sampling circuit at a predetermined voltage level of each ramp function voltage signal to sample same, the second storage means being coupled to said adjustable means and thereby dischargeable in an exponential manner by said adjustable means whereby an exponential voltage is produced modifying each said input ramp function voltage signal.

4. A circuit for modifying linear ramp function voltage signals as set for in claim 3 wherein said first and second switching and sampling circuits are each sampling keyed diode rectifier bridge circuits, and said first and second storage means are each capacitor elements.

5. A circuit for modifying linear ramp function voltage signals as set forth in claim 4 wherein said adjustable means include a pair of ganged potentiometers, one potentiometer being in the direct current output of said first storage capacitor element and the other potentiometer being in the output of said second storage capacitor elements.

6. A circuit for modifying linear ramp function voltage signals as set forth in claim 5 wherein said coupling of said first and second storage elements to said potentiometers, respectively, include isolating cathode followers.

7. A circuit for modifying linear ramp function voltage signals as set forth in claim 6 wherein said synchronizing input is coupled to said first and second switching and sampling circuits by couplings to multivibrators in turn coupled to trigger blocking oscillators which are coupled to turn each said sampling keyed diode rectifier bridge circuit off and on, the multivibrator in said coupling to said first sampling and switching circuit being a monostable multivibrator and said multivibrator in said coupling to said second sampling and switching circuit being a bistable multivibrator.

8. In an aircraft radar system for producing cathode ray tube representations of ground range, an altitude correction circuit comprising:

an input for applying ramp function voltage signals having dwell periods therebetween for driving the deflection circuits of a cathode ray tube of said system to display range of a ground area;

a radar synchronizing pulse input;

a radar null pulse input;

a first sampling and switching means coupled to said ramp function voltage signal input and to said radar synchronizing pulse input to produce a direct current voltage proportional to the voltage of said dwell periods of said ramp function voltage signals on an output thereof;

a second sampling and switching means coupled to said first sampling and switching means and to said radar synchronizing and null pulse inputs and responsive to a predetermined voltage level of each ramp function voltage signal produced by synchronized pulses to produce corresponding exponentially varying voltage pulses, each terminating with the application of a null pulse, said exponentially varying voltage pulses being over an output of said second sampling and switching circuit; and an adjustable means to adjust voltage conduction therethrough representative of the altitude of the aircraft radar system to correct for ground range at that altitude, said adjustable means being coupled to the outputs of said first and second sampling and switching circuits to adjustably control the direct current and exponential varying voltages thereof whereby the ramp function voltage signals are corrected in ramp function for the deflection circuits of a cathode ray tube radar range display to present ground range display.

9. An altitude correction circuit as set forth in claim 8 wherein said first and second sampling and switching circuits are diode bridge circuits, each switchable by pulses from a blocking oscillator circuit, the blocking oscillator producing pulses to switch said first sampling and switching diode bridge circuit being triggered by a monostable multivibrator circuit having said radar synchronizing pulse input coupled thereto to produce multivibrator operation, and the blocking oscillator circuit producing pulses to switch said second switching and sampling diode bridge circuit being triggered by a bistable multivibrator circuit having said radar synchronizing and null pulse inputs coupled thereto to start and stop bistable multivibrator operation.

10. An altitude correction circuit as set forth in claim 9 wherein said adjustable means includes a pair of ganged potentiometers, one potentiometer being in the direct current voltage output of said first sampling and switching diode bridge circuit, and the other potentiometer being in the exponentially varying voltage output of said second sampling and switching diode bridge circuit.

11. An altitude correction circuit as set forth in claim 10 wherein said first and second switching and sampling diode bridge circuits each include capacitor storage means therein, said capacitor means for storing said direct current output voltage being dischargeable over a long time period and said storage capacitor means for storing said exponential varying voltage being dischargeable through its corresponding potentiometer adjusted in accordance with corrected altitude to produce the variance of said exponential varying voltage to correct said ramp function voltage signals for altitude.

12. In an aircraft radar system for producing plan position indications of ground area during flight to present these indications in ground range, an altitude correction circuit therefor comprising:

a resolver adapted to receive ramp function voltage signals each having a dwell portion and adapted to receive signals of the angular position of the radar antenna, said resolver resolving these signals into the ramp function voltage signal proportional to the sine of the angle signal on one output thereof and into the ramp function voltage signal proportional to the cosine of the angle signal on another output thereof;

a synchronizer adapted to receive said ramp function voltage signals to produce synchronizing pulses on an output thereof;

a null detector adapted to receive said ramp function voltage signals to produce null pulse on an output thereof;

a first sampling and switching circuit in each of the two channels, one channel being coupled to receive said ramp function voltage signals proportional to the sine of the angle signal and the other channel being coupled to receive said ramp function voltage signals proportional to the cosine of the angle signal, each of which produces an output therefrom;

a second sampling and switching circuit for each channel, each being coupled to the output of the corresponding of said first sampling and switching circuit in its channel and producing a sampled output therefrom;

a first driving means coupled to said synchronizer output and to said first sampling and switching means in each channel for causing said first switching and sampling circuit to switch and sample the dwell portions of said ramp function voltage signals in synchronism to produce a direct current voltage on an output thereof;

a second driving means coupled to said synchronizer output, to said null detector output, and to said second sampling and switching means in each channel for causing said second sampling and switching means to switch and sample a predetermined level of voltage in each ramp function voltage signal proportional to the sine and cosine angle signals of each channel;

a first storage means in each channel coupled to said first switching and sampling means to store said direct current voltage on the output of said first sampling and switching means;

a second storage means in each channel coupled to said second sampling and switching means of that channel to store the sampled output voltage thereon, said second storage means being coupled to said second driving means to provide discharge of each second storage means in an exponential manner to produce an output voltage in each channel varying exponentially and coincident with the ramp function voltage signals for the sine and cosine angle signals, respectively, and an adjustable means coupled to the outputs of the first and second storage means in each channel for adjusting the voltage conduction therethrough in accordance with the altitude of the aircraft radar system to correct for ground range, whereby the ramp function voltage signals are modified by said direct current and exponential voltages from each channel to provide altitude correction for application thereof to the horizontal and vertical deflection circuits of a cathode ray tube plan position indicator to give range indications in ground range.

13. An altitude correction circuit as set forth in claim 12 wherein said first and second sampling and switching circuits are diode bridge circuits, and said first and second driving means each include a multivibrator and a blocking oscillator, the first driving means having a monostable multivibrator to which said output of said synchronizer is coupled to be triggered by pulses from said synchronizer and coupled to trigger said blocking oscillator the output of which is inductively coupled to switch said first diode bridge circuits of both channels, and the second driving means having a bistable multivibrator to which said output of said synchronizer is coupled to be triggered to one state by pulses from said synchronizer and to which said output of said null detector is coupled to produce the other state by pulses from said null detector the output of which starts and stops the blocking oscillator of the free running type and the output of which free running blocking oscillator is inductively coupled to said second diode bridge circuits in both channels.

14. An altitude correction circuit as set forth in claim 13 wherein said adjustable means includes ganged potentiometers, each having the input from said storage means to the resistance element thereof and the output therefrom taken from the adjustable tap.

15. An altitude correction circuit as set forth in claim 14 wherein said first and second storage means are each capacitor means, and said couplings of said first and second storage capacitor means with the respective first and second switching and sampling means in each channel are through cathode followers.

References Cited in the file of this patent
UNITED STATES PATENTS

| | | |
|---|---|---|
| 2,611,126 | Irving | Sept. 16, 1952 |
| 3,036,776 | Schroeder | May 29, 1962 |
| 3,072,856 | Close | Jan. 8, 1963 |